United States Patent [19]

Ataka et al.

[11] 3,744,731

[45] July 10, 1973

[54] REED FOR TAPE OR THE LIKE

[75] Inventors: Hisanori Ataka, Kawaski; Hiroshi Yamada, Ichikawa, both of Japan

[73] Assignee: Ricoh Co., Ltd., Tokyo, Japan

[22] Filed: Nov. 4, 1971

[21] Appl. No.: 195,654

[30] Foreign Application Priority Data

Jan. 14, 1971 Japan .................................. 46/655

[52] U.S. Cl. .................................................. 242/74
[51] Int. Cl. ............................................ B65h 75/28
[58] Field of Search.................... 242/74, 74.2, 71.8, 242/195, 201, 71.1; 226/91

[56] References Cited

UNITED STATES PATENTS

| | | | |
|---|---|---|---|
| 3,521,829 | 7/1970 | Wangevin | 242/74 |
| 3,084,883 | 4/1963 | Buck | 242/71.1 |
| 1,386,617 | 8/1921 | Gunderman | 242/74 |

*Primary Examiner*—George F. Mautz
*Assistant Examiner*—Edward J. McCarthy
*Attorney*—Robert Scobey et al.

[57] ABSTRACT

A flexible tape-catching ring whose circumference is longer than that of the core of a reel is loosely wrapped around the core. Upon rotation of the reel at high speed, the catching ring is revolved around the core and becomes elongated due to centrigugal force to catch the leading end of a tape or the like and to wind the tape or the like around the core.

9 Claims, 11 Drawing Figures

INVENTORS
HISANORI ATAKA
HIROSHI YAMADA
BY Robert Scobey
ATTORNEY

INVENTORS
HISANORI ATAKA
HIROSHI YAMADA
BY
Robert Scobey
ATTORNEY

REED FOR TAPE OR THE LIKE

BACKGROUND OF THE INVENTION

The present invention relates to a reel or winding device for winding a tape or the like for use with microfilm readers, tape recorders and the like.

There have been proposed various types of reels for automatically winding a microfilm tape or magnetic tape, but they are not entirely satisfactory. For example, in one type of prior art reel, the free end of a tape-catching lever catches the leading end of a tape, bearing against the outer surface of the tape. In the case of microfilm tape, the image layer is generally formed upon the outer surface of the tape, and the image layer may be easily damaged by the free end of the tape-catching lever. Another type of prior art reel utilizes a plurality of flexible tape-catching members fixed to the core of the reel, and one of them catches (by a friction element fixed to the free end thereof) the leading end of a tape or the like, bearing against the underside of the tape. In a reel of this type, damage to the image layer of the tape may be avoided, but the reel is unsatisfactory in that a plurality of catching members must be fixed to the core. Furthermore, only one end of each of these catching members is fixed to the core while the other end is free, so that these catching members tend to be broken at their roots when the reel is used for a long time.

SUMMARY OF THE INVENTION

According to the present invention, a flexible catching member whose circumference is longer than that of a core of a reel is wrapped around the core. Upon rotation of the reel at high speed, the catching ring is revolved and becomes elongated due to centrifugal force, so that the leading end of a tape or the like may be caught by the catching ring so as to wind the tape or the like around the core.

According to one embodiment of the present invention, the tape-catching ring is made of a flexible frictionable material.

According to another embodiment of the present invention, the tape-catching ring is provided with a plurality of recesses or notches formed around the peripheral edges thereof.

According to a further embodiment of the present invention, the tape-catching ring is made of a cloth and is provided with a plurality of tape-catching members securely bonded to the outer surface thereof.

According to still another embodiment of the present invention, the tape-catching member is provided with a plurality of projections formed around the outer peripheral surface thereof in a suitably spaced apart relation.

According to still another embodiment of the present invention, the tape-catching ring is made of a flexible frictionable material and is provided with a plurality of tongues which are formed along the periphery thereof and which extend outwardly under centrifugal force when the catching ring revolves but are flush with the surface of the ring when the latter does not revolve or when the tape or the like is wound around the core.

According to another embodiment of the present invention the core is provided with an annular groove formed therearound for receiving therein the tape-catching ring when the tape or the like is wound therearound.

One of the objects of the present invention is therefore to provide an improved reel for tape or the like which may substantially eliminate or overcome the defects encountered in prior art reels.

Another object of the present invention is to provide an improved reel for tape or the like which is simple in construction, yet is very reliable in operation of catching the leading end of a tape or the like to be taken up by the reel.

Other objects and advantages of the present invention will become more apparent from the following description of the presently preferred embodiments thereof taken along with the accompanying drawing.

DETAILED DESCRIPTION

Figure 1:
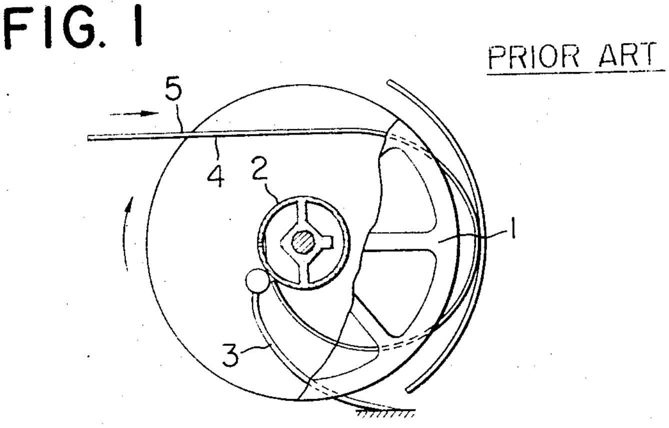
FIG. 1 PRIOR ART
FIGS. 1 and 2 are side views, partially broken away, of prior art reels.
Figure 2:
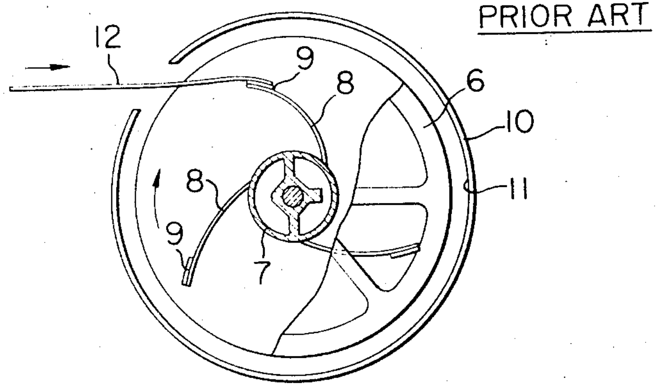
FIG. 2 PRIOR ART

As has been noted, there have been proposed various types of reels for automatically winding a microfilm tape or magnetic tape. For example, in a prior art reel 1 shown in FIG. 1, a tape-catching lever 3 is provided in such a manner that it catches the leading end of a tape 4 between the free end of the tape-catching lever 3 and core 2 of the reel. However, in the case of microfilm tape, the image layer is generally formed upon the outer surface 5, and the image layer may be easily damaged by the leading end of the tape-catching lever 3 which bears against the outer surface of the tape. Another prior art reel 6 is illustrated in FIG. 2, and includes a plurality of flexible tape-catching members 8 fixed to core 7 so that one of them catches by a friction element 9 fixed to the free end thereof the underside of the leading end of a tape 12 or the like which is transported along inner wall 11 of a tape guide member 10 located along the outer periphery of reel 6; the tape is then wound around the core 7. In a reel of this type, damage to the image layer of the tape may be avoided, but the reel is unsatisfactory since a plurality of catching members 8 must be fixed to the core 7. Furthermore, only one end of each of these catching members is fixed to the core while the other end is free; the catching members tend to break where they are attached to the core when the reel is used for a long time.

Figure 3:
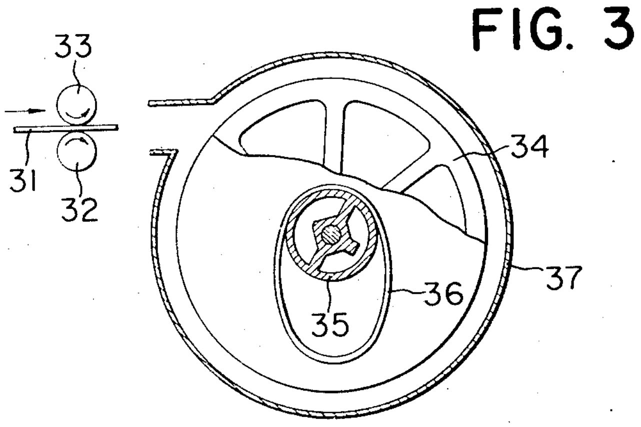
FIG. 3 is a side view, partially broken away, of a first embodiment of the present invention.

A first embodiment of the present invention is schematically illustrated in FIG. 3. A tape 31 is transported by a capstan 32 and a pinch roller 33. a flexible tape-catching ring 36 which is made of rubber, for example, is wrapped around a core 35 of a reel 34, which is surrounded by a guide 37 for leading the tape 31 toward the periphery of the reel 34.

Figures 4, 5A, 5B, 5C, 5D, 6:
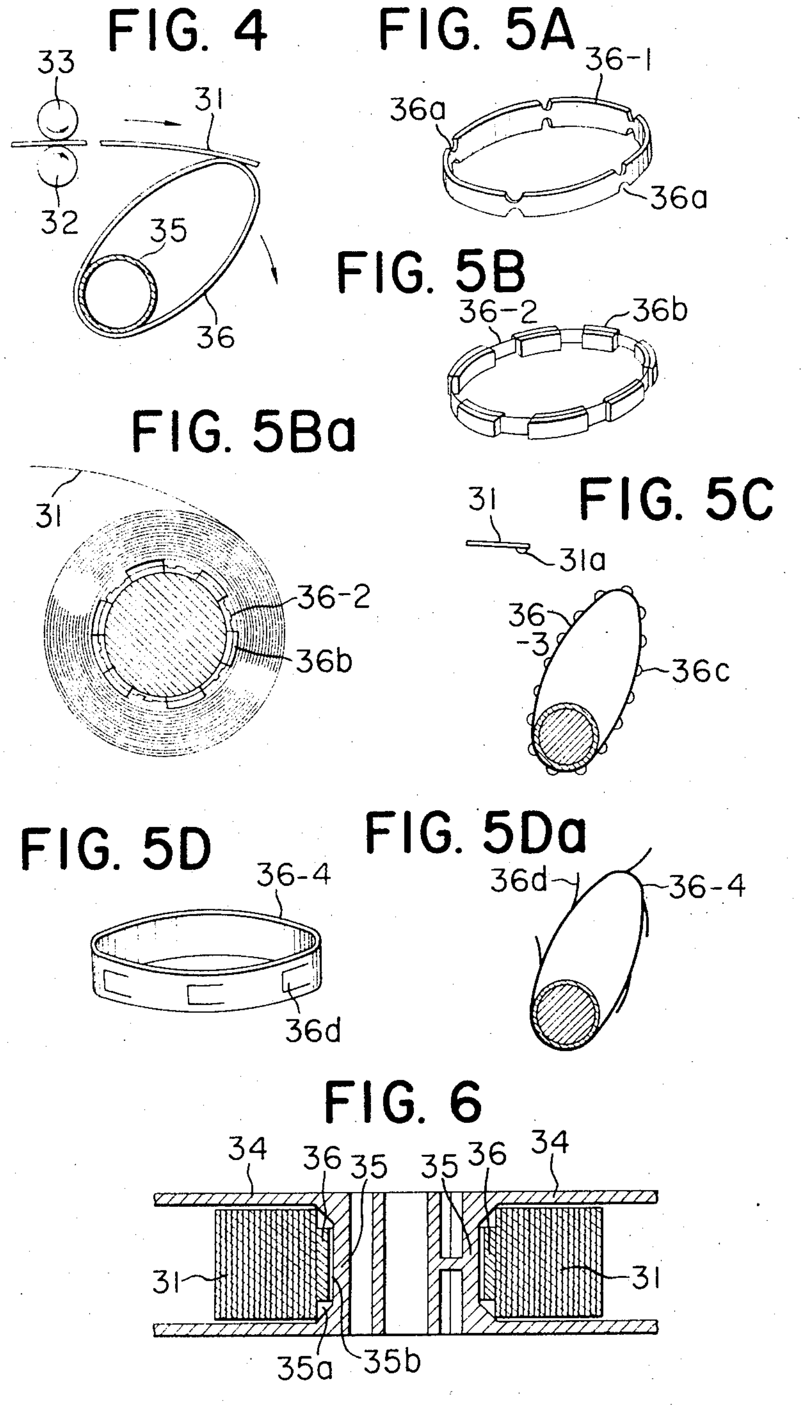
FIG. 4 is a diagrammatic view illustrating the operation of the device of FIG. 3.
FIGS. 5A–5D*a* illustrate some modifications of the tape-catching ring used in the present invention.
FIG. 6 is a fragmentary sectional view of a second embodiment of the present invention.

When the reel 34 rotates at high speed, the flexible tape-catching ring 36 has its shape distorted or becomes elongated more or less as shown in FIG. 4 due to centifugal force and rotates around the core 35, so that the tape 31 which is guided along the inner wall surface of the guide 37 is caught by the tape-catching ring 36 and is then wound around the core 35. The underside of the tape is contacted by the flexible tape-catching ring, avoiding damage to the image layer on the outer surface of the tape.

Some examples of various modifications of the tape-catching ring 36 are illustrated in FIGS. 5A–5D*a*. The tape-catching ring 36-1 shown in FIG. 5A is made of rubber, for example, and is provided with a plurality of recesses or notches 36*a* formed around the peripheral edges thereof. Thereby there may be provided better frictional engagements between the tape-catching ring, the core and the tape, so that the deformation of the tape-catching ring due to centrifugal force may be easily attained.

The tape-catching ring 36-2 shown in FIG. 5B comprises a cloth ring, for example, and a plurality of friction-engagement members 36*b* are bonded thereto in order to facilitate the engagements between the tape-catching ring, the core and the tape. When the tape 31 is wound around the core the cloth ring is closely folded or overlapped as shown in FIG. 5B*a* so that the tape 31 may be smoothly wound around the core.

The tape-catching ring 36-3 shown in FIG. 5C is provided with a plurality of projections 36c formed around the outer peripheral surface thereof, while a similar projeection 31*a* is formed at the extreme end of the tape 31 so that it may be easily caught by the ring 36-3.

A still another modification of the tape-catching ring 36-4 shown in FIG. 5D is provided with a plurality of tongues 36*d*. so that when the catching ring revolves around the core one of the tongues may project as shown in FIG. 5D*a* to catch the leading end of the tape 31. Once the tape 31 is wound around the ring 36-4, the tongues 36*d* are forced to return to their flat positions as shown in FIG. 5D so that they will not hinder the smooth winding of the tape 31 around the ring 36-4 and hence the core.

In order that the tape-catching ring does not prevent the smooth winding of the tape 31 around the core 35, the latter is provided with an annular groove 35*b* whose side walls are tapered as shown at 35*a* in FIG. 6. Therefore, once the leading end of the tape 31 is caught by the tape-catching ring and the tape 31 is started to be wound around the core, the catching ring (36 in FIG. 6) is forced into the groove 35*b* so that the tape 31 may be wound around the core 35 into a closely-packed spiral form as shown in FIG. 6.

From the foregoing description it is seen that a reel for tape or the like in accordance with the present invention is simple in construction and will not cause any damage to the surface of the film or the like wound around the core. Reels in accordance with the present invention may be advantageously used in microfilm readers, tape recorders, projectors and any other machine using tapes or the like. It is understood that the flange portions of a reel may be eliminated so that the tape or the like may be directly wound around the core. Other modifications will suggest themselves to those skilled in the art. The invention, therefore, should be taken to be defined by the following claims.

What is claimed is:

1. A reel for tapes or the like, comprising a rotatable core, and a tape-catching flexible ring which has a circumference longer than that of said core and which is loosely wrapped around said core, so that when said core rotates said tape-catching ring is deformed so as to catch the leading end of a tape or the like and to wind the tape or the like around said core.

2. A reel for tapes or the like as set forth in claim 1, including a tape guide member for guiding the leading end of said tape or the like onto said tape-catching ring.

3. A reel for tapes or the like as set forth in claim 1, wherein said tape-catching ring is made of a flexible frictionable member.

4. A reel for tapes or the like as set forth in claim 3, wherein said tape-catching ring is provided with a plurality of notches formed around the peripheral edges thereof.

5. A reel for tapes or the like as set forth in claim 1, wherein said tape-catching ring is provided with a plurality of friction members on the outer peripheral surface thereof.

6. A reel for tapes or the like as set forth in claim 5, wherein said tape-catching ring is made of a cloth material.

7. A reel for tapes or the like as set forth in claim 1, wherein said tape-catching ring is provided with a plurality of projections formed upon the outer peripheral surface thereof.

8. A reel for tapes or the like as set forth in claim 1, wherein said tape-catching ring is made of a flexible frictionable material and is provided with a plurality of tongues which are formed around the periphery thereof and extend outwardly upon rotation of said tape-catching ring.

9. A reel for tapes or the like as set forth in claim 1, wherein said core is provided with an annular groove for receiving therein said tape-catching ring when a tape or the like is wound around said core.

* * * * *